Sept. 18, 1934.  D. B. GISH  1,973,756
HOSE
Filed Dec. 27, 1933
Fig. 1.
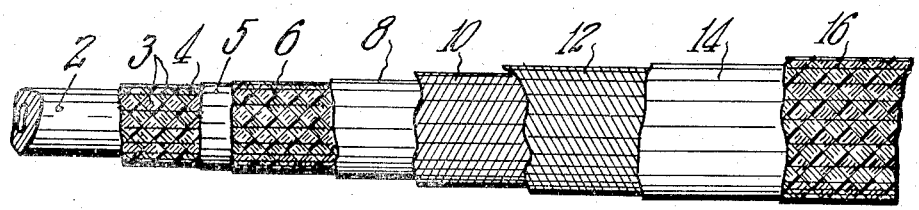
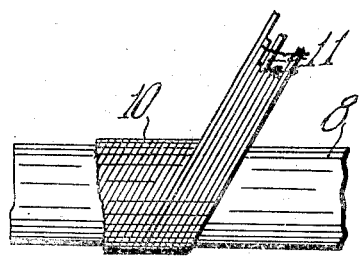
Fig. 2.
INVENTOR.
Daniel B. Gish.
BY
his ATTORNEY.

UNITED STATES PATENT OFFICE 1,973,756

HOSE

Daniel B. Gish, Springfield, Mass.

Application December 27, 1933, Serial No. 704,162

5 Claims. (Cl. 137—90)

This invention relates to improvements in hose or tubing and is directed more particularly to flexible hose or tubing adapted for conducting fluids of all kinds at high pressures and the process of making the same.

The principal objects of the invention are directed to the provision of a hose of the class described and a process for making the same whereby a novel hose is constructed which is capable of withstanding extreme pressures and is at the same time sufficiently flexible so that it may be adapted for various purposes.

According to the novel features of the invention, the hose is constructed of a number of layers of different materials having different characteristics each adapted for performing different functions and combined for co-operating with one another to provide a hose which is capable of withstanding high pressures and at the same time is flexible or bendable to the desired degree.

Hose or tubing of the class to which this invention relates has been constructed from interlacing or braiding elements over a more or less yieldable central core. A common way of producing such a hose is to insert a rod in the core and to braid or interlace elements on the core under tension. When such a hose is completed, the rod is withdrawn, but such a construction presents difficulties and objections.

The manufacturing cost of such a hose is relatively high, the braiding operation is limited to the length of the rod which is commonly about fifty feet, and the core is compressed more or less by the elements which are applied under tension so that its opening is constricted to some degree. Also, when the braided hose is subjected to pressure, the braiding tends to expand to some extent, wherefore, the opening in the core is increased in diameter, resulting in an increase in the pressure which the hose must withstand and a corresponding decrease in the structural strength of the hose.

In another way, it has been common practice to form a hose by winding layers of wire about a core. When such a hose is bent or kinked, the adjacent turns of the winding tend to open up, as does a coil spring when it is bent, and then when the hose is under high pressure the core is inclined to enter the interstices between the turns so that ruptures develop.

As a feature of this invention and as will be pointed out hereinafter more in detail, I make use of a braided reinforcing sheath or sheaths which are restrained by sheaths formed by windings of wire. The braided sheath is primarily adapted to reinforce a central core while the latter sheaths hold or restrain the braided sheath. In that way, I am able to produce a hose which is both flexible and strong and is adequately reinforced by a novel reinforcement which, in turn, is restrained against undue expansion under pressure.

Various changes and modifications may be made in the form of the invention without departing from the spirit and scope thereof and therefore I prefer to be limited, if at all, by the appended claims rather than by the description hereinafter contained. In the drawing:

Fig. 1 is a fragmentary elevational view of a hose embodying the novel features of the invention, and Fig. 2 is a similar view to explain certain features of the invention.

Referring now to the drawing more in detail the invention will be fully described.

2 represents a hollow inner tube or core which will preferably be of some more or less yieldable material or at least material which is pliable or flexible. Depending of course upon the use to which the hose is to be put, the nature of the core or the material of which it is constructed will vary, but it may well consist of some plastic composition, the chief characteristic of which is that it is bendable and pliable.

A reinforcing sheath 4 is formed around the core 2 and in the preferred embodiment of the invention this may consist of interlocked or interlaced elements. In one form of the invention, rather thin and narrow metallic ribbon-like members 3 each of which may consist of a plurality of relatively small parallel wires may be braided onto the core so as to form a continuous tubular reinforcing sheath. Such a sheath is not only a suitable reinforcement for the core when restrained against expanding according to the invention, but is flexible to provide the desired amount of flexibility or bendability to the hose structure.

As this sheath is preferably formed by a braiding operation, the elements constituting the sheath are not necessarily subjected to excessive tension. Preferably a tension for the braiding operation is employed which will produce a sheath of a desired and accurate diameter which is not characterized by an ability to expand appreciably nor to compress the core and reduce the opening therethrough. Any reduction in the opening of the core brought about by the tension of the elements may be compensated for by increasing the diameter of the opening.

In braiding in the manner described and without undue tension, it is not necessary to insert a rod or other support within the inner tube 2 for the braiding operation. Therefore it is possible not only to produce, insofar as this operation is concerned, longer lengths of hose than when a rod is used but the elements of the sheath are not loose and therefore the sheath provides adequate reinforcement.

The interlaced or braided elements provide a flexible armor or sheath for the core by the means of which the core is supported and reinforced. It will be observed the braided sheath is applied to primarily reinforce the core, a function it may efficiently perform when the braiding is held against expansion in the novel manner as will hereinafter appear.

Over the sheath 4 there is provided a relatively thin layer or sheath 5 of some relatively yieldable material such as a composition of rubber or the like. This may be formed by passing the hose through an extruding machine to form a continuous seamless layer. This provides a smooth and more or less yieldable surface layer over which a second reinforcing sheath indicated by 6 may be applied and it also serves as a protection for the sheaths over and under it. Where desired, a sheath 6 similar to sheath 4 is provided over the sheath 5 as shown. Thus the core 2 will be reinforced by a plurality of braided reinforcing sheaths such as 4 and 6 and of course any desired number may be employed.

Over the sheath 4 or the sheath 6, when used, I provide a layer or sheath 8 which like sheath 5 may be called a cushion or protecting sheath. This may be composed of material which is more or less yieldable as compared with the material of which the sheaths 4 and 6 are made. The sheath 8 may be of plastic material such as a rubber composition or the like and it may as in the case of sheath 5 be applied by means of an extruding machine capable of forming a continuous layer about an inner member. This sheath 8 is preferably relatively thin so as to provide a protection for the underlying braided sheath and also provides a smooth surface for purposes which will shortly appear.

Over the cushion layer 8 there is provided what may be called a restraining sheath 10 and this preferably consists of windings of wire. This is accomplished by simultaneously winding a plurality or group of wires arranged to be guided side by side or in parallelism about the cushion sheath 8 as is indicated in Fig. 2. It is possible in this way to provide a pitch of winding which is greater than would be the case were a single wire wound around the hose.

The sheath 8 facilitates the ready winding of the wires comprising the layer 10 since it provides a smooth surface to receive the windings so that adjacent windings are in closely abutting relation.

A restraining sheath 12 is formed simultaneously with the sheath 10 and is wound over the said sheath 10. This sheath 12 is in all its important respects similar to the sheath 10 but the wires of layer 12 are wound in a direction opposite to that of the wires of sheath 10 although the windings may have substantially the same pitch. The pitch of the winding forming the restraining sheaths may vary and depend more or less upon the use for which the hose is to be employed and/or the amount of pressure to which the hose is likely to be subjected.

By winding the restraining sheaths 10 and 12 simultaneously the torque developed by the winding of one is offset or counteracted by the torque developed in the winding of the other whereby the structure is thereby balanced which is always desirable where windings are employed.

Where the hose is to be subjected to certain conditions, a pitch of the winding is selected to best withstand those conditions, it being possible to select such pitches as may be desired. The wire or wires to be used may of course be round or non-round in cross-section, or take other forms, all as may be desired.

According to one feature of the invention when the sheaths 10 and 12 have been applied, they may be impregnated in any well-known manner with a suitable plastic material. There are many such materials adapted for this purpose. Rubber compositions or the like have been found to be suitable and an added cushioning effect may be gained thereby.

Over the outer wire sheath 12 there is provided a covering 14 which, of course, may take various forms. For instance, this covering may consist of some braided or spun fabric such as cotton or it may be formed from various compositions such as plastic material by an extruding process. Finally an outer covering such as 16 may be applied by a braiding, winding, interlacing or other operation. The coverings 14 and 16 alone are not the essential features of this invention, and it will be preferable to apply a covering or covers which will best serve the purpose for which the hose is to be used.

If desired, the cover or covers may be in the nature of metal braiding or winding or a cover may be applied by means of a lead press and may consist of compounds adapted to resist certain substances such as grease or in other cases the covering may be a metal braided or wound structure.

In Fig. 1 the covering 16 is shown as a braided metal covering similar to the braided layers 4 and 6. This is particularly desirable where the hose is subjected to pulling strains. Where the hose is subjected to a pulling action there may be a tendency for the wires of layers 10 and 12 to open up, but a covering such as 16 tends to resist elongating of the hose as lengthwise pulling stresses are applied to the hose and therefore the hose structure is strengthened against weakness caused by opening up of the wires.

It will be observed that I have provided a hose structure wherein a central more or less pliable core is reinforced by a flexible braided sheath or sheaths with the latter formed in such a way that the bore of the core is not unnecessarily constricted nor the bendability or flexibility of the hose impaired. The restraining sheaths formed by the winding or windings of wire, with the winding of one sheath disposed in the opposite direction from the winding of the other, hold the braided sheaths against expansion. The cushion sheath or sheaths of yieldable material may or may not be used but in some cases are desirable for the reasons stated. In all cases it is desirable that the wire sheaths have the turns thereof closely adjacent one another.

Altogether, the central core 2 of my novel hose is well reinforced in the desired manner by the braided sheath or sheaths while at the same time the said sheaths are restrained against undue expansion which would tend to impair their reinforcing function. Not only is the core properly and efficiently reinforced but the hose may bend or flex to the desired degree. Any opening up of crevices between the windings of the restraining sheaths is immaterial since the nature of the braided sheaths is not such that it will enter any of the openings between the windings.

It will be apparent that the inner core and braided sheaths may be formed in various ways and from various materials and that likewise the windings may be formed from wire of various forms and in various ways all to the end that the reinforcing and restraining sheaths combine and co-operate to produce the desired results.

What it is desired to claim and secure by Letters Patent of the United States is:

1. A flexible hose for transmitting fluid at high pressures comprising in combination, a core having a central opening therethrough, a reinforcing sheath therearound formed from braided metallic wire to reinforce said core, the wires not being under sufficient tension to substantially compress the core and restrict the opening therein, a cushion sheath of yieldable material around said reinforcing sheath, and superposed restraining sheaths over said cushion sheath to restrain the reinforcing sheath against expansion each of which includes a plurality of separate wires wound in adjacency, parallelism and helically to provide adjacent turns in close adjacency, the wires of one restraining sheath being wound in a direction opposite to the direction of winding of the wires in an adjacent restraining sheath and the pitch of each separate wire of each restraining sheath being equal to the pitch of the plurality of wires forming said sheath.

2. A flexible hose for transmitting fluid at high pressures comprising in combination, a core having a central opening therethrough, a sheath around said core to reinforce the same formed from braided wires, said wires not being under tension to substantially compress the core and restrict the opening therein, a cushion sheath of yieldable material around said reinforcing sheath, and superposed restraining sheaths over said cushion sheath to restrain said reinforcing sheath against expansion each of which includes a plurality of separate wires wound in adjacency, parallelism and helically to provide adjacent turns in close adjacency, the pitch of the winding of each separate wire of the restraining sheaths being equal to the pitch of the winding of the plurality of wires, and the wires of one restraining sheath being wound in a direction opposite to the direction of winding of the wires in an adjacent restraining sheath.

3. A flexible hose for transmitting fluid at high pressures comprising in combination, a core having a central opening therethrough, a plurality of reinforcing sheaths therearound formed from braided wires to reinforce said core, the wires not being under sufficient tension to substantially compress the core and restrict the opening therein, cushion sheaths of yieldable material around each of said reinforcing sheaths, and superposed restraining sheaths over the outermost cushion sheath to restrain the reinforcing sheaths against expansion, each of said restraining sheaths including a plurality of separate wires wound in adjacency, parallelism and helically to provide adjacent turns in close adjacency, the pitch of the winding of each wire thereof being equal to the pitch of the winding of the plurality of wires, and the wires of one restraining sheath being wound in a direction opposite to the direction of winding of the wires in an adjacent restraining sheath.

4. A flexible hose for transmitting fluid at high pressures comprising in combination, a core having a central opening therethrough, a plurality of reinforcing sheaths therearound formed from braided wires to reinforce said core, the wires not being under sufficient tension to substantially compress the core and restrict the opening therein, cushion sheaths of yieldable material around each of said reinforcing sheaths, and superposed restraining sheaths over the outermost cushion sheath to restrain the reinforcing sheaths against expansion, each of said restraining sheaths including a plurality of separate wires wound in adjacency, parallelism, and helically to provide adjacent turns in close adjacency, the pitch of the winding of each wire thereof being equal to the pitch of the winding of the plurality of wires, the wires of one restraining sheath being wound in a direction opposite to the direction of winding of the wires in an adjacent restraining sheath, and a braided covering enclosing said hose.

5. A flexible hose for transmitting fluid at high pressures comprising in combination, a core having a central opening therethrough, a plurality of reinforcing sheaths therearound formed from braided wires to reinforce said core, the wires not being under sufficient tension to substantially compress the core and restrict the opening therein, cushion sheaths of yieldable material around each of said reinforcing sheaths, and superposed restraining sheaths over the outermost cushion sheath to restrain the reinforcing sheaths against expansion, each of said restraining sheaths including a plurality of separate wires wound in adjacency, parallelism and helically to provide adjacent turns in close adjacency, the pitch of the winding of each separate wire thereof being equal to the pitch of the winding of the plurality of wires, and the wires of one restraining sheath being wound in a direction opposite to the direction of winding of the wires in an adjacent restraining sheath.

DANIEL B. GISH.